United States Patent [19]

Shalaby et al.

[11] Patent Number: 4,511,706

[45] Date of Patent: Apr. 16, 1985

[54] COPOLYMERS OF A 4,4'-(ETHYLENEDIOXY)BIS BENZOATE, AN ALKYLENE DIOL AND A (2-ALKENYL OR ALKYL) SUCCINIC ANHYDRIDE

[75] Inventors: Shalaby W. Shalaby, Mountainville; Dennis D. Jamiolkowski, Long Valley, both of N.J.

[73] Assignee: Ethicon, Inc., Somerville, N.J.

[21] Appl. No.: 401,494

[22] Filed: Jul. 26, 1982

[51] Int. Cl.³ ............................................. C08G 63/66
[52] U.S. Cl. ................................. 528/192; 128/335.5; 528/194; 528/195; 528/206; 528/209
[58] Field of Search ............... 528/192, 194, 206, 209, 528/195

[56] References Cited

U.S. PATENT DOCUMENTS

| | | |
|---|---|---|
| 3,278,640 | 10/1966 | Goldberg et al. .................... 528/194 |
| 3,525,715 | 8/1970 | Hrach et al. ......................... 528/194 |
| 3,542,737 | 11/1970 | Keck et al. ............................. 260/75 |
| 3,547,883 | 12/1970 | Kobayashi et al. .................. 528/194 |
| 3,632,667 | 1/1972 | Baum .................................... 528/194 |
| 3,816,368 | 6/1974 | Kobayashi et al. .................. 528/194 |
| 3,890,279 | 6/1975 | Wolfe, Jr. ............................ 260/75 R |
| 3,991,013 | 11/1976 | Pletcher .............................. 528/194 |
| 4,224,946 | 9/1980 | Kaplan .............................. 128/335.5 |
| 4,238,598 | 12/1980 | Faustritsky .......................... 528/194 |
| 4,248,995 | 2/1981 | Fayolle ................................ 528/194 |
| 4,265,802 | 5/1981 | Choe .................................... 528/194 |
| 4,346,208 | 8/1982 | Fayolle ................................ 528/194 |
| 4,387,211 | 6/1983 | Yasuda et al. ....................... 528/194 |

OTHER PUBLICATIONS

Chemical Abstracts Registry No. 24980-45-8.
Chemical Abstracts Registry No. 26373-72-8.
Chemical Abstracts Registry No. 9071-04-9.
Chemical Abstracts Registry No. 51884-53-8.
Chemical Abstracts, vol. 76, 1972, 114610y.
Chemical Abstracts, vol. 80, 1974, 83814u.
Chemical Abstracts, vol. 81, 1974, 12756g, 171028s.
Chemical Abstracts, vol. 83, 1975, 195002w.
Chemical Abstracts, vol. 84, 1976, 75556d.
Chemical Abstracts Registry No. 52826-06-9.
Chemical Abstracts, vol. 89, 1978, 60077c.

Primary Examiner—Lester L. Lee
Attorney, Agent, or Firm—Leonard Kean

[57] ABSTRACT

Copolymers of an (ethylenedioxy)bis benzoate, an alkylene diol and a (2-alkenyl or alkyl) succinic anhydride, as well as surgical devices formed therefrom; especially, flexible monofilament surgical sutures having unique handling and knot-tying characteristics.

7 Claims, No Drawings

COPOLYMERS OF A 4,4'-(ETHYLENEDIOXY)BIS BENZOATE, AN ALKYLENE DIOL AND A (2-ALKENYL OR ALKYL) SUCCINIC ANHYDRIDE

BACKGROUND OF THE INVENTION

The present invention relates to poly[alkylene-4,4'-(ethylenedioxy)bis benzoate] copolymers as well as surgical devices formed therefrom. More particularly, this invention relates to flexible monofilament surgical sutures having unique handling and knot-tying characteristics.

Many natural and synthetic materials are presently used as surgical sutures. These materials may be used as single filament strands, i.e. monofilament sutures, or as multifilament strands in a braided, twisted or other multifilament construction. Natural materials such as silk, cotton, linen, and the like, do not lend themselves to the fabrication of monofilament sutures and are accordingly used mostly in one of the multifilament constructions.

Certain synthetic materials which are extruded in continuous lengths can be used in monofilament form. Common synthetic monofilament sutures include polypropylene, polyethylene and nylon 6. Such monofilament sutures are preferred by surgeons for many surgical applications due to their inherent smoothness and noncapillarity to body fluids.

Available synthetic monofilament sutures all suffer to a greater or lesser degree from one particular disadvantage, that is relative stiffness. Besides making the material more difficult to handle and use, suture stiffness or low compliance can adversely affect knot-tying ability and knot security. It is because of the inherent stiffness of available monofilament sutures that many suture materials are braided or have other multifilament constructions with better handling, flexibility and conformity.

Most monofilament sutures of the prior art are also characterized by a high degree of stiffness. This makes knot-tying difficult and reduces knot security. In addition, the low compliance and limited ductility prevent the suture from "giving" as a newly sutured wound swells, with the result that the suture may place the wound tissue under greater tension than is desirable, and may even cause some tearing, cutting or necrosis of the tissue.

The problems associated with the use of low compliance sutures in certain applications were recognized in U.S. Pat. No. 3,454,011, where it was proposed to fabricate a surgical suture composed of Spandex polyurethane. Such sutures, however, were too elastic and did not find general acceptance in the medical profession.

Recently issued U.S. Pat. No. 4,224,946 describes a monofilament suture with good flexibility and knot strength, which suture is composed of segmented polyetheresters which contain (1) a polymeric block of polyalkylene ethers and (2) a polymeric block of aromatic dicarboxylic acids or cycloaliphatic acids with short chain aliphatic or cycloaliphatic diols. Similar subject matter is disclosed in Belgian Pat. No. 880,486.

The ethylene glycol polyester of the subject diacid moiety, 4,4'-(ethylenedioxy)bis benzoic acid, has been known for some time, (C.A. Registry No. [24980-45-8] if prepared from the acid, [26373-72-8] if prepared from the dimethyl ester) and, in fact, its ethylene glycol/-polytetramethylene oxide copolymers (C.A. Registry Nos. [9071-04-9] and [51884-53-8] have been prepared:
CA 76 114610y
CA 80 83814u mentioned in index only
CA 81 171028s
CA 81 P12175g
CA 83 P195002w manufacture of elastic fiber
CA 84 P75556d polyester composite fibers with rubber-like elasticity)
as well as copolymers based on polyethylene oxide. These polyesters have been described as possessing improved crimpability, dyeability, and moisture absorption properties.

The 1,4-butanediol polyester of the subject diacid moiety is disclosed in Chemical Abstracts [52826-06-9]. In a 1978 paper (C.A. 89 60077c) which relates to the transesterification of dimethyl esters of aromatic dicarboxy acids with α-hydro-ω-hydroxy poly(oxyethylene)s and α,ω-alkanediols, a polytetramethylene oxide/1,4-butanediol copolymer based on the subject diacid moiety was made.

In spite of the fact that several polyethers could be incorporated chemically to toughen and lower the modulus of related polyesters, it is generally accepted that linear thermoplastics possessing a high initial modulus are more difficult to modify to increase compliance. Fibers of the (all hard) homopolymers of the subject invention were found to possess moduli in excess of 1.5 million psi, which renders it unsuitable for producing monofilament sutures. Patents that relate to (2-alkenyl or alkyl)succinates are U.S. Pat. No. 3,542,737 and U.S. Pat. No. 3,890,279. None of these patents discloses the present copolymers or modifications thereof.

Theory and experience in the art of fiber chemistry predict that branching (such as that present in the instant copolymers) may inhibit fiber formation and will exert a deleterious effect on the tensile properties of any resulting fibers due to the inability of the unoriented branch to contribute to the load bearing capacity of the fiber; and by the stearic interference posed by the branch to chain alignment during fiber orientation. It is therefore surprising that strong fibers, in particular strong, flexible compliant fibers may be formed from the present copolymers with pendant hydrocarbon chains. As will be seen from Table 1, Example (i), homopolymers prepared from the 1,4-butanediol polyester of the subject diacid moiety, have a modulus of 1,678,000 psi. It is surprising that the modulus of certain of the copolymers of the present invention is reduced to only 64,000 psi.

It is an object of the present invention to provide a novel copolymer of poly(alkylene-4,4'-(ethylenedioxy)-bis benzoate) as well as surgical devices formed therefrom. It is a further object of the present invention to provide a novel flexible, thermoplastic monofilament suture or ligature of said copolymer, having a diameter of from about 0.1 to 50 mil and possessing unique and desirable physical properties. Yet a further object of the present invention is to provide a Cobalt 60 sterilizable monofilament with lower modulus, better hand and more desirable tie-down characteristics than those of monofilaments of polypropylene. It is a further object of this invention to provide a monofilament suture with a desirable degree of ductility to accommodate changing wound conditions. It is yet another object of this invention to provide a monofilament suture with the flexibility and knot-tying characteristics of a braided suture. These and other objects will be made apparent from the ensuing description and claims.

SUMMARY OF THE INVENTION

The present invention relates to a copolymer comprising a multiplicity of recurring A and B units having the following general formula:

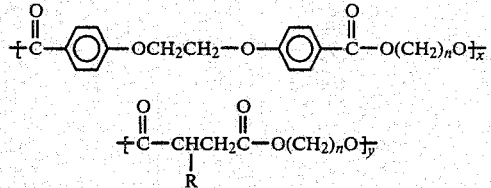

wherein
- x and y are numbers having average values such that the B units comprise from 1 to 55 weight percent of the copolymer, and the A units comprise the remainder,
- n is 2 to 8, and
- R represents a linear or branched alkyl or alkenyl radical with a chain length of 4 to 30 carbon atoms, or a mixture of such radicals with different chain lengths.

In accordance with an embodiment of the invention, n is 4 and R has a chain length of 14–18 carbon atoms, the copolymer having an inherent viscosity of between 0.5 and 2.2 and a melting temperature of between 100° and 200° C. Preferably B comprises from 20–40 weight percent of the copolymer. A preferred copolymer composition has an inherent viscosity of between 0.8 and 1.5, and a melting temperature of between 135° and 170° C.

The most preferred embodiments of this invention include those copolymers in which R is a hexadec-2-enyl group $CH_2CH=CH-(CH_2)_{12}CH_3$, and the A and B units are present on about a 72/28 mole basis; and R being a mixture of tetradec-2-enyl and octadec-2-enyl groups, the latter two R groups being present in about a 50/50 ratio (molar), the A and B units being present on about a 72/28 mole basis.

The invention also comprises surgical devices (especially sutures and clips) formed from the copolymer.

A size 3/0 strand of a filament of the present invention, has the following combination of mechanical properties:
Knot strength—at least 20,000 psi
Tensile strength—at least 30,000 psi
Young's modulus—less than about 600,000 psi
Elongation—from about 20% to 80%

Monofilament sutures of the present invention (having a size 3/0 strand) are preferably characterized by the following combination of mechanical properties:
Knot strength—30,000 to 65,000 psi
Tensile strength—45,000 to 100,000 psi (more preferably 60,000 to 100,000 psi)
Young's modulus—75,000 to 600,000 psi (more preferably 75,000 to 250,000 psi)
Elongation—from 20% to 55%

Sutures possessing the above characteristics may be prepared by melt extrusion, forming a continuous filamentry strand, and drawing the extruded filament to obtain the desired suture properties.

Monofilament sutures having physical properties in accordance with the present invention are particularly useful in many surgical procedures where the suture is used to close a wound which may be subject to later swelling or change in position. The combination of low Young's modulus and moderate to high elongation provides the suture with an appreciable degree of ductility and high compliance under low applied force. As a result, the suture is able to "give" to accommodate swelling in the wound area. In addition, the ductility and high tensile strength of the suture allow the suture to stretch during knot tie-down so that the knot "snugs down" for improved tying ability and knot security with a more predictable and consistent knot geometry regardless of variations in suture tying technique or tension.

Within the scope of the present invention is a filament as described above having a surgical needle attached to at least one end and useful as a surgical suture. Also within the scope of the present invention is such a filament or surgical suture in a sterile condition, and in addition such filament or sterile suture, packaged in a sterile enclosure. Also within the scope of the present invention is a method of closing a wound by approximating and securing the wound tissue with a filament or surgical suture of the present invention.

As may be seen from the attached Table 1, the copolymers of the present invention may be melt extruded into filaments suitable for use as synthetic sutures which are compliant and yet strong. Table 1 compares the properties of fibers formed from the present copolymer with those formed from other polymers. Specifically, Example (i) is the homopolymer of the 1,4-butanediol polyester of the subject diacid moiety. The remaining copolymers listed in Table 1 are, in each case, copolymers of the 1,4-butanediol polyester of the subject diacid moiety, with different types of non-crystallizable chain sequences (a) (known as soft-segments) which are listed at the bottom of Table 1. It will be noted that the homopolymer of Example (i) gives rise to fibers possessing moduli in excess of 1.5 million psi. Copolymers based in part on dimer acids (4G-D) according to Example (iv) as well as copolymers based in part on polyether [Examples (ii) and (iii)] give rise to values between about 250,000 and 500,000 psi even though the weight percent of the "soft" non-crystallizable portion ranges from 20% to 30%. Indeed even a polymer made to contain 30 weight percent of tetramethylene-2-octadecenyl succinate (Example IX) gives rise to fibers exhibiting a 350,000 psi Young's modulus. Polymers of Examples I, II and X provide unexpected results. The copolymer of Example I which contains 30 weight percent tetramethylene-2-hexadecenyl succinate moieties and the copolymer of Example II in which the "soft" segment is based on a mixture of tetramethylene-2-tetradecenyl succinate and tetramethylene-2-octadecenyl succinate give rise to compliant yet relatively strong fibers.

DESCRIPTION OF THE PREFERRED EMBODIMENTS

The copolymers of the present invention are prepared by the polycondensation of a 4,4'-(ethylenedioxy)bis benzoate (preferably the dimethyl ester); a diol (preferably 1,4-butanediol); and a (2-alkenyl or alkyl) succinic anhydride. A (2-alkenyl or alkyl) succinic acid or a suitable derivative, such as a dialkyl ester [for example, dimethyl(2-alkenyl or alkyl)succinate], may be substituted for the anhydride and, in addition, a mixture of more than one(2-alkenyl or alkyl) succinic anhydride may be used. The diacid, 4,4'-(ethylenedioxy)bis benzoic acid, may be used instead of the corresponding ester.

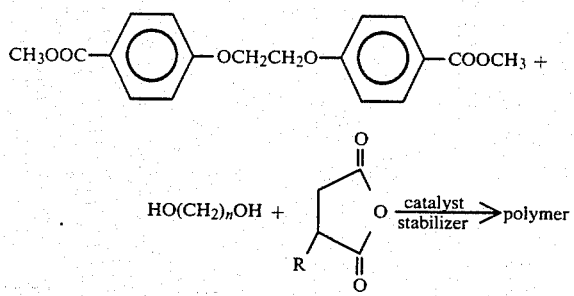

The diacid 4,4'-(ethylenedioxy)bis benzoic acid is prepared by reaction of 1,2-dihaloethane and p-hydroxybenzoic acid in the presence of a suitable base, the reaction being followed by acidification to produce the free acid (which, after purification, can be used in a direct polymerization). The dimethyl ester is prepared by Fisher esterification and purified by recrystallization from ethyl acetate. Alternatively, the diester can be prepared directly by the reaction of a 1,2-dihaloethane with methyl p-hydroxy benzoate, prepared in a nonaqueous medium in the presence of a suitable base. The dimethyl ester is used to prepare by polycondensation techniques the polyesters listed in Table 1.

The required diols are commercially available. The substituted succinic anhydrides can be prepared by the "ene" reaction of maleic anhydride and an olefin (preferably a terminal olefin):

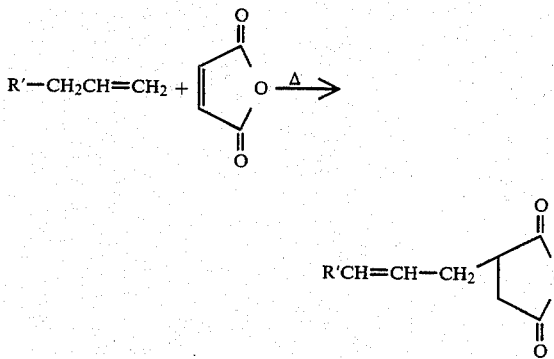

wherein R' is alkyl.

In the instance wherein R is alkyl, rather than alkenyl, the reactant may be prepared by hydrogenation of the corresponding alkenyl-succinic anhydride.

The polymerization may be run in the absence or, preferably, in the presence of stabilizers such as hindered phenols, {e.g., Irganox 1098 sold by Ciba-Geigy [N,N'-hexamethylene bis(3,5-ditertbutyl-4-hydroxy hydrocinnamide)]} or secondary aromatic amines, {e.g., Naugard 445 sold by Uniroyal [4,4'-bis($\alpha,\alpha$-dimethylbenzyl)diphenylamine]}. Acetates, oxides and alkoxides of numerous polyvalent metals may be employed as the catalyst such as, for example, zinc acetate, or magnesium acetate in combination with antimony oxide, or zinc acetate together with antimony acetate. However, the preferred catalyst for the polymerization is a mixture of about 0.04 to 0.1% (based on total charge weight) tetrabutyl orthotitanate and about 0.004 to 0.006% magnesium acetate. If a dyed product is desired, a compatible dye such as, for instance, D&C Green No. 6, can be added to the polymer or monomer mixture in concentrations of up to 0.5% based on expected polymer yield.

The polymerization is run in two stages. In the first stage, run under nitrogen at temperatures ranging from about 160° to 250° C., polycondensation via transesterification and esterification occurs, resulting in lower molecular weight polymers and oligomers. These are converted to higher molecular weight materials in the subsequent step run at about 220° to 255° C., at pressures of less than 1 mm of mercury. The resulting polymers, exhibit inherent viscosities (measured at a 0.1 g/dl concentration in hexafluoroisopropyl alcohol at 25° C.) of 0.5 to 2.2, and crystallinity of about from 20% to 50%. The Tm of the polymers (by microscopy), depending on composition, varies from about 90° to 230° C.

A summary of polymer properties is set forth in Table 1.

The polymers are readily extruded in a ram-type extruder, as for an example an Instron Capillary Rheometer at about 10° to 70° C. above the resin Tm, depending on the polymer's molecular weight. The resulting extrudates can be drawn and the total draw ratio may vary from 3X to 7X.

The unique oriented fibers exhibit an unexpected combination of properties. For example, strands of about 6 to 8 mil diameter displayed knot strenghts of 23,000–37,000 psi, straight tensile strengths of 50,000–69,000 psi and a Young's modulus of less than 350,000 psi. Percent elongations range from 23% to 37%.

In summary, the polymers described lend themselves to ready extrusion and drawing to strong and supple fibers which are useful as high compliance "ultra limp" sutures. The fibers are Cobalt 60 sterilizable without significant change in properties (in contrast to polypropylene fibers) and retain their strength in aqueous biological environment (in contrast to nylon 6 fibers).

The present polymers may also be used to prepare solid products (molded or machined) such as clips.

GENERAL POLYMERIZATION PROCEDURE

The desired amounts of dimethyl 4,4'-(ethylenedioxy)bis benzoate, a 2-alkenyl succinic anhydride (or an alkyl succinic anhydride), a 1.3 to 2.0 molar excess of an alkylene diol per mole of diacid moieties (benzoate plus anhydride) and a given stabilizer are placed under nitrogen into a dry reactor fitted with an efficient mechanical stirrer, a gas inlet tube and a takeoff head for distillation. The system is heated under nitrogen to 160° C. and stirring is begun. To the stirred reaction mixture the required amount of catalyst is added. (Alternatively, the catalyst may be added along with the other reagents at the start, if they are dry). The mixture is then stirred and heated under nitrogen for given time periods at 190° C. (2 to 4 hours) and 220° C. (1 to 3 hours). The temperature is subsequently raised to 230° to 255° C. and over a period of 0.4 to 0.7 hours, the pressure is reduced in the system to about 1 mm/Hg (preferably 0.05 mm to 0.1 mm). (Alternatively, after reaction under nitrogen, the mixture may be allowed to cool to room temperature, vacuum applied at a later date and the batch heated to the reaction temperature). Stirring and heating under the above conditions is continued to complete the polymerization. The endpoint is determined by either (a)

estimating visually the attainment of maximum melt viscosity, (b) measuring inherent viscosity or melt indices of samples removed from the reaction vessel at intermediate time periods, or (c) using a calibrated torquemeter (attached to the stirrer of the reactor).

At the end of the polymerization cycle the molten polymer is extruded and pelletized (or slow cooled in the glass reactor, isolated and ground in a mill). The polymer is dried at 80° to 110° C. for 8 to 16 hours under reduced pressure. One alternate method of polymerization is set forth in U.S. Pat. No. 3,890,279.

GENERAL EXTRUSION PROCEDURE

Extrusion using the Instrom Capillary Rheometer produces an extrudate which upon drawing (3× to 7× ratio) yields fibers in the 7 to 13 ml diameter range. The polymers are packed in the extrusion chamber and extruded through a 40 mil die after a dwell time of 9 to 13 minutes at the extrusion temperature. The ram speed is 2 cm/minute. While extrusion temperatures depend both on the polymer Tm and on the melt viscosity of the material at a given temperature, extrusion at temperatures of 10° to 70° C. above the Tm is usually satisfactory. The extrudate is taken up at a speed of about 18 to 24 feet per minute.

GENERAL DRAWING PROCEDURE

The extrudate (diameter range, 19–23 mils) is passed through rollers at an input speed of four feet per minute and then over a hot shoe or into a heated draw bath of glycerine. The temperatures of the hot shoe or draw bath vary from about 50° C. to 120° C. The draw ratio in this first stage of stretching varies from 3× to 6×. The drawn fibers are then placed over another set of rollers into a glycerine bath (second stage) kept at temperatures ranging from 60° C. to 100° C. Draw ratios of up to 2× are applied but usually only a slight amount of fiber extension (1.25×) is found desirable at this stage. Finally, the fiber is passed through a water wash, dried and taken up on a spool.

The copolymers of the present invention may be spun as multifilament yarn and woven or knitted to form sponges or gauze, (or nonwoven sheets may be prepared) or used in conjunction with other compressive structures as prosthetic devices within the body of a human or animal where it is desirable that the structure have high tensile strength and desirable levels of compliance and/or ductility. Useful embodiments include tubes, including branched tubes, for artery, vein or intestinal repair, nerve splicing, tendon splicing, sheets for tying up and supporting damaged kidney, liver and other abdominal organs, protecting damaged surface abrasions, particularly major abrasions, or areas where the skin and underlying tissues are damaged or surgically removed.

In more detail, the surgical and medical uses of the filaments of the present invention include, but are not necessarily limited to:

Knitted products, woven, or nonwoven including velours
a. burn dressings
b. hernia patches
c. medicated dressings
d. fascial substitutes
e. gauze, fabric, sheet, felt or sponge for liver hemostasis
f. gauze bandages
  In combination with other components
a. arterial graft or substitutes
b. bandages for skin surfaces
c. burn dressings (in combination with polymeric films)
  Solid products, molded or machined
a. orthopedic pins, clamps, screws and plates
b. clips
c. staples
d. hooks, buttons, and snaps
e. bone substitutes (e.g., mandible prosthesis)
f. needles
g. intrauterine devices
h. draining or testing tubes or capillaries
i. surgical instruments
j. vascular implants or supports
k. vertebal discs
l. Extracorporeal tubing for kidney and heart-lung machines
m. artificial skin and others.

TABLE 1

Physical Properties of Fibers of Poly[tetramethylene-4,4'-(ethylenedioxy)bis benzoate] and its Corresponding Polyether, Dimerate and Alkenyl Succinate Copolymers

| | Example No. | | | | | | | | |
|---|---|---|---|---|---|---|---|---|---|
| | (i) | (ii) | (iii) | (iv) | I | II | VIII | IX | X |
| Type of non-crystallizable chain segment (a) | None (b) | PTMO—EDBB | PTMO—EDBB | 4G—D | 4G—$S_{16}$ | 4G—$S_{14}/S_{18}$ | 4G $S_{18}$ | 4G $S_{18}$ | 4G $S_{18}$ |
| Wt. % of non-crystallizable chain segment | 0.00 | 20 | 30 | 25 | 30 | 14 16 | 25 | 30 | 40 |
| Mole % of non-crystallizable chain segment | 0.00 | 7 | 11 | 16 | 28 | 14 14 | 22 | 27 | 36 |
| Polymer Inherent Viscosity, dl/g (HFIP, 25° C., 0.1 g/dl) | 1.40 | 1.70 | 1.13 | 0.99 | 1.06 | 0.88 | 0.78 | 0.66 | 0.72 |
| Polymer Tm (by microscopy), °C. | 198 | 180 | 173 | 166 | 150 | 150 | 158 | 163 | 150 |
| Extrusion Temperature, °C. | 260 | 240 | 200 | 250 | 200 | 200 | 240 | 175 | 185 |
| Drawing Conditions | | | | | | | | | |
| One Stage "Hot-Shoe": Ratio | 5X | 5X | — | — | — | — | — | — | — |
| Temp., °C. | 101 | 101 | — | — | — | — | — | — | — |
| Multi-Stage Glycerin Draw Bath: | | | | | | | | | |
| 1st Stage: Ratio | — | — | 5X | 5X | 5X | 5X | 5X | 7X | 5X |
| Temp., °C. | — | — | 53 | 55 | 55 | 52 | 55 | 58 | 50 |
| 2nd Stage: Ratio | — | — | 1.2X | 1.3 | 1.2X | 1.2 | 1.3X | — | 1.2X |
| Temp., °C. | — | — | 70 | 70 | 70 | 70 | 75 | — | 75 |
| Overall Draw Ratio | 5X | 5X | 6X | 6.5X | 6X | 6X | 6.5X | 7X | 6X |
| Physical Properties of Fibers | | | | | | | | | |
| Diameter, mil | 9.5 | 9.3 | 8.9 | 7.5 | 7.7 | 7.9 | 6.6 | 6.5 | 8.1 |
| Straight Tensile Strength, | 59 | 65 | 51 | 71 | 65 | 65 | 69 | 53 | 50 |

TABLE 1-continued

Physical Properties of Fibers of Poly[tetramethylene-4,4'-(ethylenedioxy)bis benzoate] and its Corresponding Polyether, Dimerate and Alkenyl Succinate Copolymers

| | Example No. | | | | | | | | |
|---|---|---|---|---|---|---|---|---|---|
| | (i) | (ii) | (iii) | (iv) | I | II | VIII | IX | X |
| psi × 10$^{-3}$ | | | | | | | | | |
| Knot Tensile Strength, psi × 10$^{-3}$ | 48 | 39 | 31 | 30 | 31 | 35 | 37 | 28 | 23 |
| Elongation, % | 27 | 45 | 42 | 24 | 31 | 36 | 26 | 23 | 37 |
| Modulus, psi × 10$^{-3}$ | 1678 | 471 | 283 | 356 | 166 | 140 | 314 | 350 | 64 |

(a) PTMO—EDBB = polytetramethylene oxide-4,4'-(ethylenedioxy)bis benzoate
4G—D = tetramethylene dimerate (from oleic acid dimerization)
4G—S$_{16}$ = tetramethylene-2-hexadecenylsuccinate (i.e. n = 4 and R = 2-hexadecenyl)
4G—S$_{14}$ = tetramethylene-2-tetradecenylsuccinate (i.e. n = 4 and R = 2-tetradecenyl)
4G—S$_{18}$ = tetramethylene-2-octadecenylsuccinate (i.e. n = 4 and R = 2-octadecenyl)
(b) The 1,4-butanediol based homopolymer, poly[tetramethylene-4,4'-(ethylenedioxy)bis benzoate]

The following are specific examples for producing new copolymers in accordance with the present invention.

EXAMPLE I

To a flame dried mechanically stirred, 100 ml two-neck glass reactor, suitable for polycondensation, is charged 19.60 g of dimethyl 4,4'-(ethylenedioxy) bis benzoate (59.34 mmoles), 7.41 g of 2-hexadecenylsuccinic anhydride (23.0 mmoles), 14.83 g of 1,4-butanediol (164.6 mmoles), and 0.1510 g Erganox 1098 (0.5% of expected weight of formed polymer).

After purging the reactor and venting with nitrogen, the reactor is immersed in a silicone oil bath and connected to a gas supply to maintain nitrogen at 1 atmosphere of pressure. The stirred mixture is heated to 160° C.; the side neck is unstoppered and under a flush of nitrogen, 0.16 ml of an alcoholic tetrabutyl orthotitanate/magnesium acetate solution is carefully injected. (Preparation of catalyst solution: to 0.5000 g of anhydrous magnesium acetate is added 16.5 ml of methanol and 33 ml of a tetrabutyl titanate in n-butyl alcohol solution, previously prepared by mixing 12.3 ml of tetrabutyl titanate in 100 ml of n-butyl alcohol). After restoppering, the stirred mixture is heated to and maintained at 190°, 200°, and 220° C. for 1, 2, and 3 hours respectively, during which time the distillate is collected. The reactor is allowed to cool to room temperature. Some time later, the reactor is evacuated and heated to 150° C. to melt the reaction mass. Over the course of one hour, the temperature is slowly raised to 240° C. which is maintained for 6 hours. The collection of distillates is continued during the low pressure (less than 100 microns) stage of the polymerization. The reactor is removed from the oil bath and allowed to cool. The formed polymer is isolated, ground and then dried at 80° C. for 8 hours in vacuo. The polymer has an inherent viscosity of 1.06 dl/g as determined in hexafluoroisopropanol at 25° C. and a concentration of 0.1 g/dl.

EXAMPLES II TO X

A polymerization is carried out as described in Example I except that the reactor is charged with the ingredients listed in Table 2. The temperature at which the polymers melt is dependent on the composition so that in the transition from reaction under nitrogen to reaction under vacuum, a higher or lower temperature may have to be employed to melt the cooled reaction mass.

Table 3 lists the types of A and B units present in the copolymers obtained according to each of Examples I through X, as well as the weight and mole percent of each unit present in each copolymer.

TABLE 2

| Example No. | Amount of Dimethyl 4,4'-(ethylenedioxy) bis benzoate (g) | Anhydride | | Diol | |
|---|---|---|---|---|---|
| | | Type | Amount (g) | Type | Amount (g) |
| I | 19.60 | 2-hexadecenylsuccinic | 7.41 | 1,4-butanediol | 14.83 |
| II | 19.60 | 2-tetradecenylsuccinic | 3.38 | 1,4-butanediol | 14.83 |
| | | 2-octadecenylsuccinic | 4.03 | | |
| III | 19.60 | 2-butenylsuccinic | 6.17 | 1,4-butanediol | 17.91 |
| IV | 19.60 | 2-triacontenylsuccinic | 7.96 | 1,4-butanediol | 13.46 |
| V | 26.60 | 2-decenylsuccinic | 1.16 | 1,4-butanediol | 15.39 |
| VI | 14.00 | 2-hexadecenylsuccinic | 12.34 | 1,4-butanediol | 14.54 |
| VII | 21.28 | 2-hexadecenylsuccinic | 7.97 | ethylene glycol | 11.06 |
| VIII | 21.00 | 2-octadecenylsuccinic | 6.26 | 1,4-butanediol | 14.68 |
| IX | 19.60 | 2-octadecenylsuccinic | 7.52 | 1,4-butanediol | 14.56 |
| X | 16.80 | 2-octadecenylsuccinic | 10.02 | 1,4-butanediol | 14.32 |

In addition to the diester, the anhydride, and the diol, to each run is charged 0.1510 g of Erganox 1098 and 0.16 ml of a catalyst solution. Preparation of catalyst solution: to 0.5000 g of anhydrous magnesium acetate is added 16.5 ml of methanol and 33 ml of a tetrabutyl titanate in n-butyl alcohol solution, previously prepared by mixing 12.3 ml of tetrabutyl titanate in 100 ml of n-butyl alcohol.

TABLE 3

| Example No. | Type of A Unit | Type of B Unit | Weight Percent | | Mole Percent | |
|---|---|---|---|---|---|---|
| | | | A | B | A | B |
| I | Tetramethylene-4,4'-(ethylenedioxy)bis benzoate | Tetramethylene-2-hexadecenylsuccinate | 70 | 30 | 72 | 28 |
| II | Same as in I | Tetramethylene-2-tetradecenylsuccinate | 70 | 14 | 72 | 14 |
| | | Tetramethylene-2-octadecenylsuccinate | | 16 | | 14 |

TABLE 3-continued

| Example No. | Type of A Unit | Type of B Unit | Weight Percent A | Weight Percent B | Mole Percent A | Mole Percent B |
|---|---|---|---|---|---|---|
| III | Same as in I | Tetramethylene-2-butenylsuccinate | 70 | 30 | 60 | 40 |
| IV | Same as in I | Tetramethylene-2-triacontenylsuccinate | 70 | 30 | 79 | 21 |
| V | Same as in I | Tetramethylene-2-decenylsuccinate | 95 | 5 | 94 | 6 |
| VI | Same as in I | Tetramethylene-2-hexadecenylsuccinate | 50 | 50 | 53 | 47 |
| VII | Ethylene-4,4'-(ethylenedioxy)bis benzoate | Ethylene-2-hexadecenylsuccinate | 70 | 30 | 72 | 28 |
| VIII | Same as in I | Tetramethylene-2-octadecenylsuccinate | 75 | 25 | 78 | 22 |
| IX | Same as in I | Tetramethylene-2-octadecenylsuccinate | 70 | 30 | 73 | 27 |
| X | Same as in I | Tetramethylene-2-octadecenylsuccinate | 60 | 40 | 64 | 36 |

EXAMPLE XI

Ten grams of the copolymer described in Example I are packed into the extrusion chamber of an Instron Rheometer equipped with a 40 mil die and, after 10 minutes of dwell time, the sample is extruded at a ram speed of 2 cm/minute, and a temperature of 200° C. The takeup speed of the extrudate is 18 ft/minute and the extrudate is quenched in ice water. The diameter of the extrudate is 19 to 23 mils.

The extrudate is drawn at 5× through a glycerine bath held at a temperature of 55° C. and at 1.2× through a second glycerine bath heated to 70° C. The resulting fiber is washed in a water bath (room temperature) to remove the glycerine and taken up on a spool. The total draw ratio for both the first and second drawing stage is 6×. Tensile data for fiber obtained by this and other extrusion and draw experiments are shown in Table 1.

We claim:

1. A copolymer consisting essentially of a multiplicity of recurring A and B units having the following general formula:

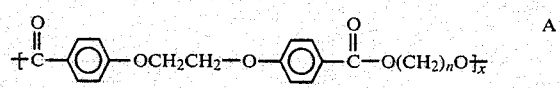 A

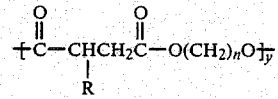 B wherein
x and y are numbers having average values such that the B units comprise from 1 to 55 weight percent of the copolymer, and the A units comprise the remainder,
n is 2 to 8, and
R represents a linear or branched alkyl or alkenyl radical with a chain length of 4 to 30 carbon atoms, or a mixture of such radicals with different chain lengths.

2. The copolymer of claim 1, wherein n is 4 and R has chain lengths of 14 to 18 carbon atoms, said copolymer having an inherent viscosity (in hexafluoroisopropanol at a concentration of 0.1 g/dl and at a temperature of 25° C.) of between 0.5 and 2.2 and a melting temperature of between 100° and 200° C.

3. The copolymer of claim 2, wherein the B unit comprises from 20 to 40 weight percent of the copolymer, said copolymer having an inherent viscosity of between 0.8 and 1.5, and a melting temperature of between 135° and 170° C.

4. The copolymer of claim 3, wherein R is a hexadec-2-enyl group.

5. The copolymer of claim 4, wherein the B unit comprises about 30 weight percent of the copolymer.

6. The copolymer of claim 3, wherein R is a mixture of tetradec-2-enyl and octadec-2-enyl groups.

7. The copolymer of claim 6, wherein the tetradec-2-enyl and octadec-2-enyl groups are present in about a 50/50 mole ratio.

* * * * *